United States Patent
De Vita et al.

(10) Patent No.: US 12,523,681 B2
(45) Date of Patent: Jan. 13, 2026

(54) TRANSISTOR DRIVING A LOAD, AND CORRESPONDING CIRCUIT ARRANGEMENT FOR SENSING

(71) Applicant: STMicroelectronics S.r.l., Agrate Brianza (IT)

(72) Inventors: Placido De Vita, Acicatena (IT); Salvatore Abbisso, Augusta (IT); Giovanni Luca Torrisi, Aci Catena (IT); Antonio Davide Leone, Siziano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 248 days.

(21) Appl. No.: 18/371,313

(22) Filed: Sep. 21, 2023

(65) Prior Publication Data

US 2024/0103046 A1    Mar. 28, 2024

(30) Foreign Application Priority Data

Sep. 28, 2022   (IT) .................. 102022000019947

(51) Int. Cl.
| | |
|---|---|
| *G01R 17/16* | (2006.01) |
| *G01R 17/04* | (2006.01) |
| *G01R 19/00* | (2006.01) |
| *G01R 19/165* | (2006.01) |
| *G01R 19/257* | (2006.01) |
| *G05F 1/46* | (2006.01) |

(52) U.S. Cl.
CPC ............ *G01R 17/16* (2013.01); *G01R 17/04* (2013.01); *G01R 19/0023* (2013.01); *G01R 19/16523* (2013.01); *G01R 19/257* (2013.01); *G05F 1/461* (2013.01)

(58) Field of Classification Search
CPC .... G01R 17/16; G01R 17/04; G01R 19/0023; G01R 19/16523; G01R 19/257
See application file for complete search history.

(56) References Cited

U.S. PATENT DOCUMENTS 5,959,464 A * 9/1999 Qualich ............. G01R 19/0092
                                                                  361/103
9,831,773 B2   11/2017 Polhemus
(Continued)

FOREIGN PATENT DOCUMENTS

CN            113030683 A       6/2021

OTHER PUBLICATIONS

IT Search Report and Written Opinion for priority application, IT Appl. No. 102022000019947, report dated Apr. 27, 2023, 6 pgs.

*Primary Examiner* — Dominic E Hawkins
(74) *Attorney, Agent, or Firm* — Crowe & Dunlevy LLC (57) ABSTRACT

A pre-driving stage drives one or more Field Effect Transistors in a power stage driving a load. A method for measuring current flowing in the Field Effect Transistors includes: measuring drain to source voltages of the one or more Field Effect Transistor; and measuring an operating temperature of the one or more Field Effect Transistor. The current flowing in the Field Effect Transistors is measured by: calculating the respective on drain to source resistance at the operating temperature as a function of the measured operating temperature and obtaining the current value as a ratio of the respective measured drain to source voltage over the calculated drain to source resistance at the operating temperature.

17 Claims, 2 Drawing Sheets

(56) References Cited

U.S. PATENT DOCUMENTS

| | | | |
|---|---|---|---|
| 2015/0123629 A1* | 5/2015 | Ohshima | H02M 1/32 |
| | | | 323/271 |
| 2016/0365128 A1* | 12/2016 | Chen | G11C 7/1057 |
| 2017/0179824 A1* | 6/2017 | Polhemus | G01R 19/0092 |
| 2018/0175610 A1* | 6/2018 | Mayell | H03K 17/18 |
| 2020/0177090 A1* | 6/2020 | Braz | H02M 3/33592 |

* cited by examiner

Fig. 1

# TRANSISTOR DRIVING A LOAD, AND CORRESPONDING CIRCUIT ARRANGEMENT FOR SENSING

PRIORITY CLAIM

This application claims the priority benefit of Italian Application for Patent No. 102022000019947 filed on Sep. 28, 2022, the content of which is hereby incorporated by reference in its entirety to the maximum extent allowable by law.

TECHNICAL FIELD

The embodiments of the present disclosure relate to a method for sensing a current flowing in a transistor driving a load, and a corresponding circuit arrangement for sensing.

In particular, the solutions here described are directed to sense the current flowing in a Field Effect Transistor, in particular a MOSFET, at a predriving stage, the MOSFET being external with respect to the predriving stage, in the MOSFET of a H bridge driving a load, in particular a motor.

BACKGROUND

In the state of art there are several known applications which involve a pre-diver stage which controls the operation of one or more external transistors, specifically MOSFETs, which in their turn drive a load (e.g., the motor of an actuator). In particular, is well known to have MOSFETs in configuration of H bridges or half bridges to drive a load, their control signals, in particulate to their control electrode, usually the gate electrode, being supplied by a pre-driving stage.

The predriver or predriving stage is an integrated circuit controlling and driving a power stage, comprising such one or more external MOSFETS, in particular in H bridge configuration, not embedded in the same integrated circuit (i.e., not in the same chip). Therefore, the external MOSFET is a MOSFET belonging to a circuit arrangement differently packaged with respect to the pre-driving stage (i.e., on another integrated circuit or chip).

This type of arrangement with a predriver and the power stage, where the external MOSFET on different chips may occur for instance where are several actuators, is used for DC electric motors, for instance in the automotive field.

In such a context, to sense and control current of the load, an operational amplifier is provided which reads the current that flows in a series shunt resistor. Such an approach with an additional external shunt resistor able to directly read out the current, however, adds a significant cost. Moreover, in some applications, a series shunt increases the power dissipation of the system, adding a voltage drop in series with the load, which is crucial when high currents are involved.

There is accordingly a need, considering the foregoing, to provide solutions that are able to overcome one or more of the limits of the prior art.

SUMMARY

Embodiments herein comprise a method for sensing a current and a circuit arrangement for performing the method. The embodiments moreover concern a corresponding method for operating an electronic architecture.

In an embodiment, a method is provided for sensing, at an electronic circuit in an integrated circuit comprising a pre-driving stage driving one or more Field Effect Transistor, in particular MOSFET, comprised in a power stage driving one or more loads, a current flowing in said one or more Field Effect Transistor, in particular MOSFET, said one or more Field Effect Transistor being arranged external with respect to said integrated circuit in which said pre-driving stage is arranged.

The method comprises: measuring a drain to source voltage of said one or more Field Effect Transistors; measuring an operating temperature of said one or more Field Effect Transistors; measuring a current flowing in said one or more Field Effect Transistors by calculating respective drain to source on resistance at the operating temperature as a function of said measured operating temperature and obtaining said current as a ratio of the respective measured drain to source voltage over said calculated drain to source on resistance at the operating temperature.

In various embodiments, said method further comprises calculating the respective drain to source on resistance at the operating temperature as a function of said measured operating temperature calibrated by a calibration value obtained at a given reference temperature, in particular room temperature, wherein a calibration step to obtain said calibration value is performed prior said measuring a drain to source voltage of the one or more Field Effect Transistors.

In various embodiments, said method comprises performing a calibration to obtain said calibration value comprising: performing a power on of each Field Effect Transistor at a determined operating temperature, in particular corresponding to room temperature; then injecting a fixed calibration current in the drain electrode of each Field Effect Transistor; measuring the corresponding drain to source voltage by the pre-driver; calculating the drain to source on resistance at the determined operating temperature, in particular room temperature, e.g. 25° C., as a calibration value that is calculated as a ratio of the measured drain to source voltage to the fixed calibration current; and storing said calibration value.

In various embodiments, measuring a drain to source voltage of said one or more Field Effect Transistors comprises comparing output of said one or more Field Effect Transistors to a respective reference voltage, in particular performing a sample and hold operation on the output of said comparison, and, in particular, selecting among the output values of the comparison of the outputs of said one or more Field Effect Transistors to a respective reference voltage the values to pass to said step of measuring a current flowing in said one or more Field Effect Transistors.

In various embodiments, measuring an operating temperature of said one or more Field Effect Transistors comprises: measuring the forward voltage of diodes (in which is injected a determined diode current and are arranged adjacent to the one or more Field Effect Transistors so as to be subject to the same operating temperature; and calculating said operating temperature as a function of a known value of the forward voltage at room temperature and of the diode forward voltage temperature coefficient, in particular the difference of the measured forward voltage to the forward voltage at room temperature over the temperature coefficient.

In various embodiments, measuring an operating temperature of said one or more Field Effect Transistors further comprises one or both of the following steps: a) measuring the temperature difference between the Field Effect Transistors and the position where the corresponding diode among said diodes is soldered through a thermal map of a board on which the power stage is arranged, storing said temperature difference between the two points as a correction factor, applying said correction factor each time said measuring an operating temperature of said one or more Field Effect Transistor is performed; and/or b) prior to performing said measuring step providing positions in said board on which the power stage is arranged where the diodes can be soldered by obtaining a heat map of said board, soldering the diodes in the points matching a difference temperature criterion, in particular showing the minimum temperature difference.

In various embodiments, said one or more Field Effect Transistors are arranged in a bridge configuration or in a half bridge configuration.

The solution described herein also refers to a circuit arrangement comprising an electronic circuit in an integrated circuit comprising a pre-driving stage driving one or more Field Effect Transistors, in particular MOSFETs, comprised in a power stage driving one or more loads, a current flowing in said one or more Field Effect Transistors, in particular MOSFETs, said one or more Field Effect Transistors (MHx, MLx) being arranged external with respect to said integrated circuit in which said pre-driving stage is arranged, characterized in that is configured to perform the method according to any of the previous embodiments.

In various embodiments, said electronic circuit comprises a control module comprising a microprocessor, said electronic circuit further comprising one or more differential operational amplifiers which inputs are coupled to the output electrode of respective among said one or more external Field Effect Transistors and the other input is coupled to the supply voltage or to ground depending if the Field Effect Transistors is coupled to the supply voltage or to ground, to output the respective drain to source voltage; a multiplexer receiving as input said drain to source voltages outputs of said one or more differential operational amplifiers and configured to select one or more of said drain to source voltages outputs as one or more of the multiplexer outputs; said differential operational amplifiers being configured to compare an output of said one or more Field Effect Transistors to a respective reference voltage, in particular performing a sample and hold operation on the output of said comparison, and, in particular, selecting by said multiplexer among the output values of the comparison of the outputs of said one or more Field Effect Transistors to a respective reference voltage the values to pass to said step of measuring a current flowing in said one or more Field Effect Transistors. Said control module is configured, in particular by an internal analog to digital converter, to convert said one or more of said drain to source voltages into digital values supplied to said control module.

In various embodiments, said circuit arrangement comprises one or more diodes arranged in said power stage adjacent said one or more Field Effect Transistors so that they are subject substantially to the same temperature, and said electronic circuit comprises one or more current generators controlled by said control module injecting a respective controlled current in each of said one or more diodes, an analog to digital converter coupled to measure the forward voltage drop on each of said diodes and supplying its digital value to said control module. Said circuit arrangement is configured for measuring an operating temperature of said one or more Field Effect Transistor by measuring the forward voltage of said diodes by said analog to digital converter, injecting said determined diode current by said one or more current generators. Said control module is configured to calculate said operating temperature as a function of a known value of the forward voltage at room temperature and of the diode forward voltage temperature coefficient in particular the difference of the measured forward voltage to the forward voltage at room temperature over the temperature coefficient.

In various embodiments, said one or more external Field Effect Transistors are arranged in one or more H-bridge configurations comprising a first pair of a high side Field Effect Transistor and a low side Field Effect Transistor and a second pair of a high side Field Effect Transistor and a low side Field Effect Transistor. Said output electrode corresponds to a node where the source of the high side Field Effect Transistor and the drain of the low side Field Effect Transistor of a pair of Field Effect Transistors are coupled. Said one or more operational amplifiers comprise for each pair of Field Effect Transistors an amplifier coupled to said common node which other input is coupled to the source of the high side Field Effect Transistor to output the high side drain to source voltage and an amplifier coupled to said common node which other input is coupled to the drain of the low side Field Effect Transistor to output the low side drain to source voltage.

In various embodiments, said one or more bridge configurations drive respective DC electric motors.

BRIEF DESCRIPTION OF THE DRAWINGS

The embodiments of the present disclosure will now be described with reference to the annexed drawings, which are provided purely by way of non-limiting example, and in which.

DETAILED DESCRIPTION

In the ensuing description, various specific details are illustrated, aimed at providing an in-depth understanding of the embodiments. The embodiments may be provided without one or more of the specific details, or with other methods, components, materials, etc. In other cases, known structures, materials, or operations are not illustrated or described in detail so that various aspects of the embodiments will not be obscured.

Reference to "an embodiment" or "one embodiment" in the framework of the present disclosure is intended to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. Moreover, particular conformations, structures, or characteristics may be combined in any adequate way in one or more embodiments.

The references used herein are provided only for convenience and hence do not define the sphere of protection or the scope of the embodiments.

As explained previously, various embodiments of the present disclosure regard an electronic circuit arrangement comprising a predriving stage and a driving power stage comprising Field Effect transistors, in particular MOSFETs, and a method for sensing the current in such transistors.

Figure 1:
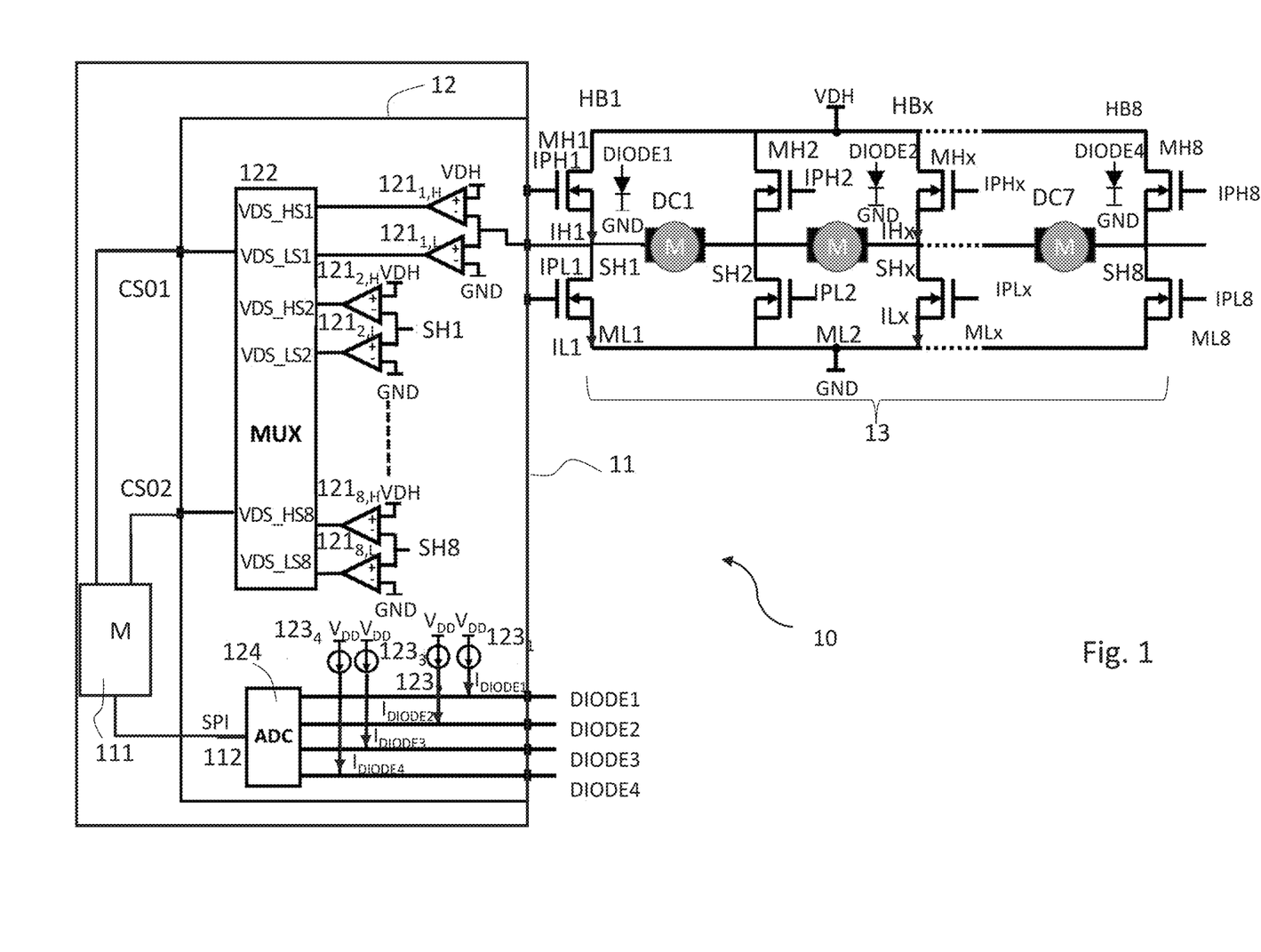
FIG. 1 shows a schematic circuit diagram of an embodiment of a circuit arrangement according to the solution described herein.

To this regard, FIG. 1 shows a circuit arrangement 10 comprising a predriving stage 12 and power stage 13 configured to sense the current flowing in one or more, in the example a plurality, of external MOSFETS MH1, ML1, . . ., MH8, ML8.

The circuit arrangement 10 comprises an integrated circuit predriver 12, on a respective integrated circuit chip, which is configured to supply driving signals IPH1, IPL1, . . ., IPH8, IPL8 to such power stage 13 comprising a set of one more MOSFETs, i.e., to supply the signals to the gate electrodes of such plurality of external MOSFETS MH1, ML1, . . ., MH8, ML8. The power stage 13 is arranged on a different integrated circuit chip or on different integrated circuit chips with respect to the integrated circuit predriver 12.

A control module 11, comprising a microprocessor or a microcontroller (M) 111, is shown, which is on the same chip and comprises the predriver 12, although in variant embodiments it may be an external module with respect to the predriver 12.

In the example of said plurality of external MOSFETS MH1, ML1, . . ., ML8 is arranged in a plurality of half bridges HB1, HB8 which drive corresponding motors DC1, . . ., DC7.

With x=1, 2, . . ., 8 is here indicated the index of a generic leg of the half bridge HBx, comprising the MOSFETs MHx, MLx. In general, an H-bridge comprises two legs each including two MOSFETS in series arranged between the voltage supply VDH and the ground GND. In example of FIG. 1, half bridges using each a single leg are used. The generic high side MOSFET MIEN of the x-th leg has its drain coupled to the voltage supply VDH, while the low side MOSFET MLx of the x-th leg has its source coupled to ground GND. The source of the high side MOSFET MHx and the drain of the low side MOSFET MLx, which are their output electrodes, are coupled together in a common output node SHx which is the output of the leg and in the example shown that output is coupled to one of the terminals of the respective motor. In the example shown, there is a first leg with MOSFETS MH1, ML1 with an output node SH1 coupled to a terminal of a first motor DC1, then a second leg with MOSFETs MH2, ML2 with an output node SH2 coupled to the other terminal of the first motor DC1. Such legs using MOSFETs MH1, ML1 and MOSFETs MH2, ML2 form the first half bridge HB1. The output SH2 of the second leg using MOSFETs MH2, ML2 of the first bridge HB1 is also coupled to a terminal of the second motor DC2. A third leg using MOSFETs MH3, ML3 is coupled to the other terminal of the second motor DC2 by its output node SH3. Proceeding accordingly, seven motors DC1, . . ., DC7 can be driven using eight half bridges HB1, HB8.

The gate electrodes of the MOSFETS MIEN, MLx of a generic leg of one of the half bridges HB1, . . ., HB8 are driven by driving signals, comprising high side driving signal IPHx and low side driving signal IPLx, that command their open and close state according to configurations which are known per se in the art of driving half bridges and full H-bridges and determine, for instance, the corresponding motor to move right or left, or coast, or brake, or go in short circuit state.

FIG. 1 also shows at the source electrodes the currents IHx, ILx flowing in each external MOSFET MHx, MLx, which are to be sensed in order to obtain a control quantity which can be used by the control module 11 to control the driving of the MOSFET MHx, MLx by the pre-driver stage 12.

In the circuit arrangement 10 the output nodes SHx are coupled to the inputs of operational amplifiers 121 in the predriver 12. As shown, each output node SHx is coupled to the inverting input terminal of a high side operational amplifier $121_{x,H}$, where the other input terminal is coupled to a high side voltage supply VDH, while the output node SHx is also coupled to the positive input of another operational amplifier $121_{x,L}$, where other input terminal is coupled a low side voltage supply such as ground GND.

Therefore, the high side operational amplifier $121_{x,H}$ amplifies the difference between the source voltage of the high side MOSFET to the voltage supply VDH, which corresponds to the drain voltage of the high side MOSFET MIEN, to output a high side drain to source voltage VDS_HSX, while the low side operational amplifier $121_{x,L}$ correspondingly obtains the low side drain to source voltage VDS_LSX, by amplifying the difference between the drain voltage of the low side MOSFET MLx to the ground voltage GND. Of course, the operational amplifiers 121 may have unity as the amplifying ratio or gain, although other value of gain can be of course managed, e.g., by the control module.

A multiplexer 122 receives the high side and low side drain to source voltages output by the operational differential amplifiers 121, which preferably are in sample and hold configuration, and under the control a selection signal issued for instance by the control module can select on outputs CSO1, CSO2 which of the high side and low side drain to source voltages are supplied to the control module (i.e., to the microprocessor or microcontroller 111).

Diodes DIODE1, . . ., DIODE4 are arranged in proximity with the MOSFETS of each pair of bridges HB1, . . ., HB8, so that they are subject to the same operating temperature or working temperature. With same operating temperature of course is here is meant a temperature very close, ideally the same, or with a small difference, the operating temperature, same or with a small difference, of the diode varying substantially as the temperature of the MOSFETs or JFET to which are adjacent. In their anodes are injected respective polarization currents $I_{DIODE1}, \ldots, I_{DIODE4}$ by respective current generators $123_1, \ldots, 123_4$, which are shown as comprised in the predriver 12.

In particular, in the embodiment shown, since there are four diodes DIODE1, . . ., DIODE4, and eight legs HB1, . . ., HB8, it is chosen to place the diode near the high side MOSFET which while driving a motor, e.g. DC1, is conducting the most of time. With two half bridges, such as HB1 and HB2, coupled to the terminals of the motor DC1, they are usually driven, in order in order to have the motor rotate in the forward direction, by maintaining the high side MOSFET MH1 of the first leg HB1 switched on and by using the state of switch on and switch off of the low side MOSFET ML2 of the other leg HB2 to control the motor. Therefore, diode DIODE1 is placed closed to the high side MOSFET MH1. The other diodes are placed with the same criterion. This allows to use only four diodes and a corresponding number of current generators $123_1, \ldots, 123_4$, in order to limit the size of the whole circuit and of the chip, as well as the costs. Clearly, if the size or the costs of the circuit and chip allow, in variant embodiment each high side MOSFET may have a diode placed nearby, and in general different number of diodes and placements may be use depending on the circuit parameters and requirements. In this configuration, each of the four diodes DIODE1, DIODE4 may be implemented as a discrete device positioned adjacent the discrete MOSFETs forming the half-bridge so that the diode is at a substantially same temperature as the temperature of the MOSFETs.

The predriver stage 12 includes an analog to digital converter 123 which inputs are coupled to the anodes of diodes DIODE1, DIODE4, and which digital output is coupled through a SPI Interface 112 to the microprocessor or microcontroller 11 of the control module 11.

Figure 2:
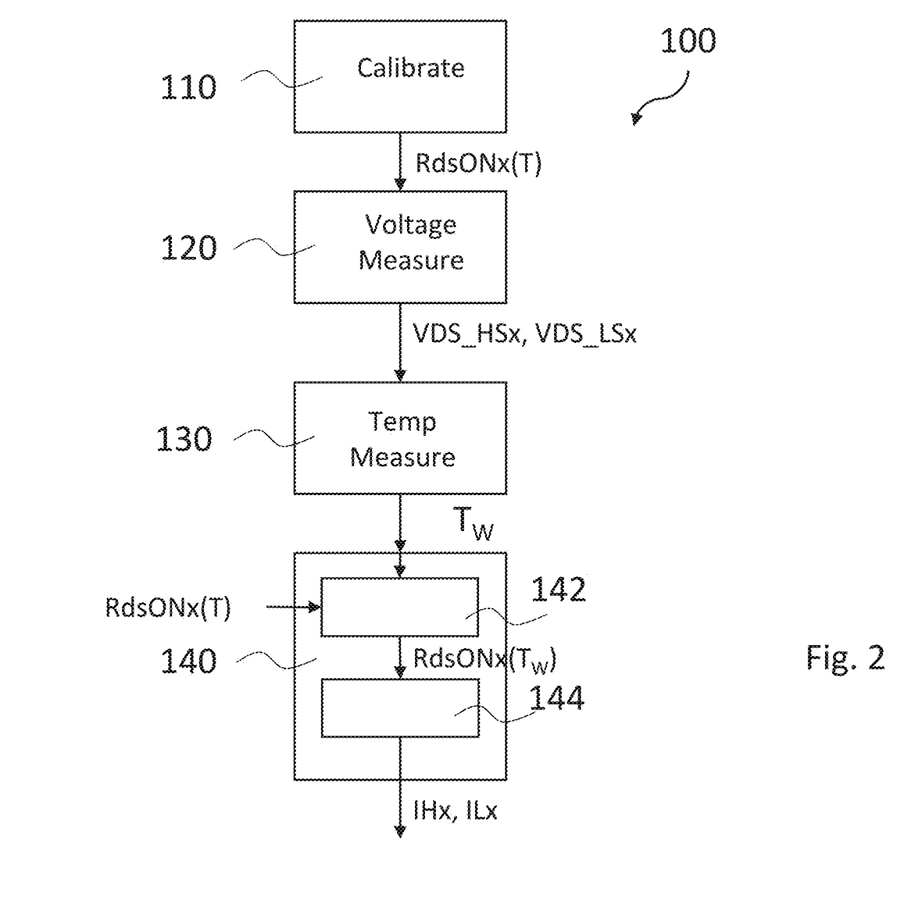
FIG. 2 shows a flow diagram representing an embodiment of the method according to the solution described herein.

FIG. 2 shows a flow diagram which represents an embodiment of a current sense method according to the solution here described, indicated as a whole with 100.

Step 110 indicates performing a calibration of the drain to source ON resistance RdsONx of each external MOSFET MHx, MLx to obtain the value of the respective drain to source resistance RdsONx as a function of temperature T, i.e., RdsONx(T). This step 110 may be performed preliminarily, and not all the times the method 100 is performed.

Step 120 indicates measuring of the drain to source voltage of each external MOSFET MHx, MLx, obtaining respective voltages VDS_HSX VDS_LSX.

Step 130 indicates a subsequent measuring of the operating temperature Tw of said of each external MOSFET MHx, MLx.

Step 140 indicates a calculating of the currents IHx, ILx flowing in said of each external MOSFET MHx, MLx by obtaining the respective on drain to source resistance RdsONx at the measured operating temperature Tw and by obtaining said current as the ratio of the respective drain to source voltage VDS_HSx, VDS_LSx over said calculated drain to source resistance RdsONx at the operating temperature.

The method here described in embodiments may comprise steps 120 to 140, while the calibration step 110, besides, as mentioned, is executed at a different time, e.g., at the factory, prior to the normal operation time of the circuit 10, can be possibly performed only once, e.g., at the factory, or in any case not all the times that the circuit 10 is used, i.e. the calibration 110 is performed less frequently.

The calibration step 110 comprises, in embodiments, performing a power on, i.e., switch on, of each MOSFET MHx, MLx at an operating temperature Tw corresponding to room temperature.

Then a fixed calibration current Ical, for example of 10A, is sent in the drain electrode of each external MOSFET MHx, MLx, and the drain to source voltage VDS_HSX, VDS_LSX must be measured by the pre-driver 12 through the amplifiers 121. Such fixed calibration current Ical is sent through an external current generator, not shown in the figures, in order to obtain a good accuracy.

The logic module 11, e.g., the microcontroller 111, then calculates the drain to source ON resistance RdsON at room temperature, e.g., 25° C., as the ratio of the drain to source voltage to the fixed current, i.e., e.g., VDS_HSX/10A for the high side. This value is stored in the logic module 11, e.g., in the microcontroller 11 memory.

A curve RdsONx(T) of the variation of the on drain to source resistance RdsON as a function of the temperature is also stored in the microcontroller 111 memory, so that, as explained in the following with reference to step 140, then for each measured drain to source voltage VDS_HSX, VDS_LSX and knowing the operating temperature Tw at which the measurement is performed, the microcontroller 111 of the control module 11 is then able to calculate the current of the MOSFETs MI-Ix, MLx.

The step 120 of measuring the drain to source voltage of each MOSFET MHx, MLx, obtaining voltages VDS_HSx, VDS_LSx makes use of a specific circuit arrangement in the pre-driver stage 12 or on the same chip to measure the drain to source voltage VDS_HSx, VDS_LSx of each high and low side MOSFET MHx, MLx.

Such circuit arrangement does not require external pins, i.e., external with respect to the chip of the pre-driver 12: the common node SHx signal (source of high sides MOSFETs MHx and drain of low sides MOSFETs MLx) is coupled to the multiplexer 122, through the operational amplifiers 121.

When the drain to source voltage VDS_HSx of the generic high side MOSFET MI-Ix is required, the voltage on the respective output common mode SHx is brought to the common input of the two dedicated amplifiers $121_{x,H}$, $121_{x,L}$.

The two amplifiers $121_{x,H}$, $121_{x,L}$ are in operational amplifier configuration to make the read value available to the microcontroller 111 of the control logic module 11 by the two multiplexer output pins CSO1 and CSO2, one for the high side, the other for the low side, outputs of the multiplexer 122. Such multiplexer output pins CSO1/CSO2 are coupled to the input of an ADC, not shown, in the microcontroller 111 which reads the drain to source voltage VDS_HSx, VDS_LSx values at said pins CSO1/CSO2.

The step 130 of measuring the operating temperature Tw of said each external MOSFET MEN, MLx uses the diodes DIODE1, DIODE4 controlled by the control module 11, where each diode is placed as close as possible to each respective H-bridge HB1, HB4. The forward voltage, Vf, of the diodes varies with temperature, therefore the temperature coefficient of the diode component embodying DIODE1, DIODE4 is needed to get an accurate representation of its junction temperature. The control structure of the diodes DIODE1, DIODE4 includes current generators 123 supplying the respective polarization currents $I_{DIODE1}$ ..., $I_{DIODE4}$, injecting a small polarization current (programmable from 250 uA to 1 mA) in the anode of the respective diode DIODE1, DIODE4, while the cathode is coupled to the ground pin GND of the pre-driver stage 12.

The voltage drop across each diode DIODE1, DIODE4 is then measured by the analog to digital converter 123 which inputs are coupled to nodes DIODE1, ..., DIODE 4, and which digital output is coupled through a SPI Interface 112 to the microprocessor or microcontroller 111 of the control module 111.

By reading the forward voltage at an unknown temperature Y, Vf(Y° C.), knowing the forward voltage at room temperature, Vf(25° C.), in particular at 25° C. and knowing the temperature coefficient TC of the forward voltage Vf, the microcontroller 111 calculates the operating or working temperature Tw[° C.] by applying the following formula:

$$Tw[° C.] = Ta + [Vf(x° C.) - Vf(25° C.)]/TC$$

$T_a$ indicates the room temperature, in this case 25° C.

The forward voltage at room temperature, Vf(25° C.), varies slightly from component to component: to overcome this behavior, calibration data during the manufacturing process can be applied: in this case the forward voltage at room temperature, Vf(25° C.) can be measured during the manufacturing process at the factory and the value can be stored in the microcontroller 111 memory.

Regarding step 130, if a more precise temperature measurement is required, two methods of mapping the heat can be further adopted:

a) the first method provides measuring the temperature difference between the H-bridge MOSFETs MHx, MLx and the point where the corresponding diode among diodes DIODE1, ..., DIODE4 is soldered through the thermal map of the application board. The temperature difference between the two points is then saved in the memory of the microcontroller 111 as a correction factor: each time the microcontroller 111 carries out the temperature measurement in the step 130 through the corresponding diode among diodes DIODE1, DIODE4, the microcontroller 111 applies such previously stored correction factor to obtain a temperature measurement of the MOSFET MHx, MLx which is closer to reality; and/or b) the second method provides places in the PCB (Printed Circuit Board) where the diodes DIODE1, DIODE4 can be soldered in order to find the best spot to sense the temperature. By obtaining a heat map of the application board the user is able to discover the most suitable place where to put the thermal sensor. In this way the measurement made by the selected diode among diodes DIODE1, DIODE4 is closer to the real MOSFET temperature. In any case, a corrective factor, as provided by the solution a) can be taken into consideration.

Thus, such measuring 130 an operating temperature Tw of said one or more Field Effect Transistor MHX, MLx further comprise one or both of the following steps:

a) measuring the temperature difference between the Field Effect Transistors MHx, MLx and the position where the corresponding diode among said diodes DIODE1, DIODE4 is soldered through a thermal map of a board on which the power stage 13 is arranged, storing said temperature difference between the two points as a correction factor; applying said correction factor each time said measuring 130 an operating temperature Tw of said one or more Field Effect Transistor MHX, MLx is performed; and/or b) prior to performing said measuring step 130 providing positions in said board on which the power stage 13 is arranged where the diodes DIODE1, ..., DIODE4 can be soldered by obtaining a heat map of said board, soldering the diodes DIODE1, ..., DIODE4 in the points matching a difference temperature criterion, in particular showing the minimum temperature difference.

It is underlined the thermal sensor or sensors represented by the diodes can also be used in the normal operation mode for controlling the maximum PCB temperature.

Then, regarding the step 140 of measuring the current flowing in said of each external MOSFET MHx, MLx, after having known the temperature at which the corresponding H-bridge is working from step 130 and having measured the drain to source voltage VDS_HSx, VDS_LSx, the microcontroller 111 calculates the operation or working current by the following steps:

1) calculating 142 the RdsON at working temperature, RdsONx(Tw). The microcontroller 111 has in its memory the trend of the variation curve RdsON(T) in temperature: knowing the temperature, the microcontroller 11 can estimate the value of the on drain to source resistance RdsONx(Tw) at the operating temperature Tw at which the H bridge corresponding to MOSFET MHx, MLx is working;

2) then calculating 144 the current IHx, ILx, flowing through the external MOSFETS MOSFET MEN, MLx. At this point, for instance for the high side MOSFET MHx (for the low side MOSFET the calculation is dual) the microcontroller 111 has calculated the value of the on drain to source resistance RdsONx(Tw) at the operating temperature Tw and has acquired the measured value of the drain to source voltage VDS_HSx of the higher side MOSFET MEN: the current IHx flowing in the H-bridge is calculated as the ratio between the drain to source voltage VDS_HSx VDS_HSx and the drain to source resistance RdsONx(Tw) at the operating temperature Tw.

By way of example:

in step 110 a calibration current Ical=10 A±1% is applied which gives a calibration drain to source voltage Vds_cal=0.7 V±0.002V. Thus, their ratio is Rds ON_cal=70 mΩ±1%@25 C=RDsONx(25° C.);

then the step 130 of measurement of the temperature measures or reads the room temperature forward voltage of the diode Vf(25° C.)=0.6 V±0.005 V, while during operation of the circuit 10 is measured Vf (Tw)=0.4 V±0.005 V. The operating temperature Tw is thus obtained as 125° C.±5% from the Vf(T) curve stored in the microcontroller 111;

subsequently, using the temperature curve of the on drain source resistance RdsON stored in the microcontroller 111, in step 142 is RdsONx(T)=RDsONx(25° C.)*[1+(Tw−25)/150]=116 mΩ±6%. 1*[1+(Tw−Ta(=25° C.)/150] is the formula of the curve of the RdsONx(T), with Ta room temperature;

then, as for step 130, VDS=1V±0.002V=>1V±0%, VDS can be VDS_HSx or VDS_LSx;

in the step 144 it is calculated I=Vds/Rds(on)(T)=8.6 A±6%, I can be IHx or ILx.

It is underlined that the description is referred to MOSFETS arranged in H bridges, but the method here described can be applied to half bridges, and also to single external Field Effect Transistors, in particular MOSFET, representing the power driver of a load, coupled for instance to its drain.

Thus in general the solution here described refers to a method for sensing, in particular indirectly, at an electronic circuit in an integrated circuit comprising a pre-driving stage 12 driving one or more Field Effect Transistor, e.g. generically MHx, MLx, in particular MOSFET, comprised in a power stage 13 driving one or more loads, e.g. DC1, ..., DC4, a current flowing in said one or more Field Effect Transistor, e.g. MHx, MLx, in particular MOSFET, such one or more Field Effect Transistor (MHx, MLx) being arranged external with respect to said integrated circuit in which said pre-driving stage 12 is arranged. Such one or more Field Effect Transistors, specifically MOSFETS can be one or more, if they are a plurality, they can be arranged in bridge configuration, e.g., HB1, ..., HB4, with two legs of high side and low side MOSFETS, or also in half bridges, i.e., one leg with high side and low side MOSFETs driving a load.

The method 100 comprises: measuring, step 120, a drain to source voltage VDS_HSx, VDS_LSx, of said one or more Field Effect Transistor MHX, MLx; measuring, step 130, an operating temperature, Tw of said one or more Field Effect Transistor, MHX, MLx; measuring, step 140, a current IHX, ILx flowing in said one or more Field Effect Transistor (MHX, MLX), i.e., the current flowing from drain to source, by calculating, step 142, the respective on drain to source resistance at the operating temperature, e.g. RdsONx(Tw)) as a function, e.g. the stored curve (RdsONx(T)) or a stored equation describing the variation of the RdsON with the temperature T, of said measured operating temperature, e.g. Tw, and by obtaining, step 144, said current, IHX, ILx, as the ratio of the respective measured drain to source voltage VDS_HSx, VDS_LSx over such calculated drain to source resistance at the operating temperature, e.g. RdsONx(Tw).

If half bridges are used, such one or more external Field Effect Transistor MHx, MLx are arranged in one or more half bridge configurations each comprising a pair of high side Field Effect Transistor, e.g. MH1, MH3, MH5, MH7, and low side Field Effect Transistor, e.g. ML1, ML3, ML5, ML7, the output electrode corresponding to a node, e.g. generically SHx, where the source of the high side Field Effect Transistor, e.g. MH1, MH3, MH5, MH7, and the drain of the low side Field Effect Transistor (e.g. ML1, ML3, ML5, ML7 of a pair of Field Effect Transistors, in this case the first pair, are coupled; the one or more operational amplifiers 121 comprising for each pair of Field Effect Transistors, generically MHx, MLx an amplifier 121H,x coupled to such common node SHx, which other input is coupled to the source of the high side Field Effect Transistor MH1, MH3, MH5, MH7, to output the high side drain to source voltage, VDS_HSx, and an amplifier, $121_{L,x}$, coupled to said common node SHx, which other input is coupled to the drain of the low side Field Effect Transistor, ML1, ML3, ML5, ML7, to output the low side drain to source voltage, VDS_LSx.

In case full H-bridges, with two legs each, are used to drive the load, at each common node of a leg, i.e. pair of high side and low side Field Effect Transistor, a respective pair of amplifiers $121_{x,H}$, $121_{x,L}$ is coupled.

In case a single FET or MOSFET is used, not bridges, to drive a load, single amplifiers 121 coupled to their outputs, e.g. drain, may be used, which in any case perform a sampling on their output to be selected by the multiplexer 122 in order to read the drain to source voltage on the microprocessor 111.

Thus, based on the above, the advantages of the described solution are clear.

The solution described here is a new and innovative approach to measuring the current flowing in the external MOSFETs driven by a pre-driver on another chip. The proposed solution presents the advantage of not using external resistors, with the consequence of a lower cost of the application and no voltage drop in series to the load.

The removal from an application board of the sensing resistors is possible, which have a significant cost in the total budget of the full application.

The claims form an integral part of the technical teaching of the disclosure provided herein.

Of course, without prejudice to the principle of the invention, the details of construction and the embodiments may vary widely with respect to what has been described and illustrated herein purely by way of example, without thereby departing from the scope of the present invention, as defined by the ensuing claims.

The description above is referred to Field Effect Transistors which are embodied by MOSFETs, although the solution may encompass other types of Field Effect Transistors, such as JFET.

The invention claimed is:

1. A method comprising:
measuring a drain to source voltage of each of one or more Field Effect Transistors in a power stage driving one or more loads;
measuring an operating temperature of said one or more Field Effect Transistors; and
determining a current flowing in said one or more Field Effect Transistors by:
calculating a respective drain to source on resistance of each of said one or more Field Effect Transistors at the operating temperature as a function of said measured operating temperature; and
obtaining said current as a ratio of the respective measured drain to source voltage over said calculated drain to source on resistance at the operating temperature.

2. The method according to claim 1, wherein calculating the respective drain to source on resistance at the operating temperature as a function of said measured operating temperature is calibrated by a calibration value obtained at a given reference temperature, the method further comprising performing a calibration operation to obtain said calibration value prior to measuring the drain to source voltage of the one or more Field Effect Transistors.

3. The method according to claim 2, wherein the given reference temperature is room temperature.

4. The method according to claim 2, wherein performing the calibration operation comprises:
powering on each Field Effect Transistor of the one or more Field Effect Transistors at the given reference temperature;
injecting a fixed calibration current in a drain electrode of each Field Effect Transistor;
measuring a corresponding drain to source voltage in response to the fixed calibration current;
calculating the drain to source on resistance at the given reference temperature to provide a calibration value, wherein calculating the drain to source on resistance comprises calculating a ratio of the measured drain to source voltage to the fixed calibration current; and
storing said calibration value.

5. The method according to claim 1, wherein measuring the drain to source voltage of said one or more Field Effect Transistors comprises:
comparing an output voltage of said one or more Field Effect Transistors to a respective reference voltage;
performing a sample and hold operation on an output of said comparison; and
selecting among the sampled and held outputs to pass for use in measuring the current flowing in said one or more Field Effect Transistors.

6. The method according to claim 1, wherein measuring the operating temperature of said one or more Field Effect Transistors comprises:
injecting a determined diode current into a diode arranged adjacent to the one or more Field Effect Transistors so as to be subject to a same operating temperature;
measuring a forward voltage of the diode; and
calculating said operating temperature as a function of a known value of the forward voltage at room temperature and of a diode forward voltage temperature coefficient.

7. The method according to claim 6, wherein calculating comprises determining a difference of the measured forward voltage to the forward voltage at room temperature over the temperature coefficient.

8. The method according to claim 6, wherein measuring the operating temperature of said one or more Field Effect Transistors further comprises:
measuring a temperature difference between a position of the Field Effect Transistors and a position where the diode is soldered through a thermal map of a board on which the power stage is arranged;
storing said temperature difference as a correction factor; and
applying said correction factor each time said measuring an operating temperature of said one or more Field Effect Transistors is performed.

9. The method according to claim 6, wherein measuring the operating temperature of said one or more Field Effect Transistors further comprises:
providing positions in a board on which the power stage is arranged where the diodes can be soldered;
obtaining a heat map of said board; and
soldering the diodes in the positions in the board matching a difference temperature criterion which provides a minimum temperature difference.

10. The method according to claim 1, wherein said one or more Field Effect Transistors are arranged in a full H-bridge configuration.

11. The method according to claim 1, wherein said one or more Field Effect Transistors are arranged in a half bridge configuration.

12. A circuit, comprising:
a power stage configured to drive one or more loads, said power stage including one or more Field Effect Transistors; and
a pre-driving stage configured to drive the one or more Field Effect Transistors;
wherein the pre-driving stage comprises:
a circuit configured to measure a drain to source voltage of each Field Effect Transistor of the one or more Field Effect Transistors;
a circuit configured to measure an operating temperature of said one or more Field Effect Transistors; and
a processing circuit configured to determine a current flowing in said one or more Field Effect Transistors by:
calculating a respective drain to source on resistance of each Field Effect Transistor of said one or more Field Effect Transistors at the operating temperature as a function of said measured operating temperature; and
obtaining said current as a ratio of the respective measured drain to source voltage over said calculated drain to source on resistance at the operating temperature.

13. The circuit according to claim 12:
wherein said processing circuit comprises a control module including a microprocessor;
wherein said circuit configured to measure the drain to source voltage comprises one or more differential operational amplifiers, each differential operational amplifier having a first input coupled to an output electrode of a respective Field Effect Transistor of the one or more Field Effect Transistors and a second input coupled to one of a supply voltage or a ground voltage; and
further comprising a multiplexer configured to receive as input the measured drain to source voltages output from said one or more operational amplifiers and configured to select one or more of the input drain to source voltages for output;
said control module configured to convert, using an analog to digital converter, the selected one or more of the input drain to source voltages to digital values supplied to said microprocessor.

14. The circuit according to claim 13:
wherein said one or more Field Effect Transistors are arranged in one or more half bridge configurations each comprising a pair of high side Field Effect Transistor and low side Field Effect Transistor;
wherein said output electrode corresponds to a node where a source of the high side Field Effect Transistor and a drain of the low side Field Effect Transistor of the pair of Field Effect Transistors are coupled; and
wherein said one or more differential operational amplifiers comprise, for each pair of Field Effect Transistors, a first amplifier coupled to said common node and having another input coupled to a source of the low side Field Effect Transistor and a second amplifier coupled to said common node and having another input coupled to a drain of the high side Field Effect Transistor.

15. The circuit according to claim 14, wherein said one or more half bridge configurations drive respective DC electric motors.

16. The circuit of claim 12, wherein the circuit configured to measure the operating temperature comprises:
one or more diodes arranged in said power stage adjacent said one or more Field Effect Transistors so as to be subject substantially to a same temperature;
one or more current generators controlled to inject a respective controlled current in each of said one or more diodes; and
an analog to digital converter coupled to measure a forward voltage drop on each of said diodes and output a corresponding digital value to the processing circuit.

17. The circuit according to claim 12, wherein said circuit configured to measure the operating temperature comprises:
one or more diodes arranged in said power stage adjacent said one or more Field Effect Transistors so as to be subject substantially to a same temperature; and
a circuit configured to measure a forward voltage of said diodes in response to an injected diode current;
wherein the processing circuit is configured calculate the operating temperature as a function of a known value of a forward voltage at room temperature and a diode forward voltage temperature coefficient TC depending on a difference between the measured forward voltage to the forward voltage at room temperature over the temperature coefficient.

* * * * *